(12) United States Patent
Zhang et al.

(10) Patent No.: US 9,201,192 B2
(45) Date of Patent: Dec. 1, 2015

(54) BENDING INSENSITIVE SINGLE MODE OPTICAL FIBER

(71) Applicant: YANGTZE OPTICAL FIBRE AND CABLE JOINT STOCK LIMITED COMPANY, Wuhan, Hubei (CN)

(72) Inventors: Lei Zhang, Hubei (CN); Yiwen Wu, Hubei (CN); Ming Ye, Hubei (CN); Mingfeng Mao, Hubei (CN); Zhiyong Wang, Hubei (CN); Ruichun Wang, Hubei (CN); Raadjkoemar Matai, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 14/196,417

(22) Filed: Mar. 4, 2014

(65) Prior Publication Data
US 2014/0185996 A1   Jul. 3, 2014

Related U.S. Application Data

(63) Continuation of application No. PCT/CN2012/086974, filed on Dec. 20, 2012.

(30) Foreign Application Priority Data

Jan. 10, 2012   (CN) .......................... 2012 1 0006792

(51) Int. Cl.
*G02B 6/02* (2006.01)
*G02B 6/028* (2006.01)
*G02B 6/036* (2006.01)

(52) U.S. Cl.
CPC ............ *G02B 6/0283* (2013.01); *G02B 6/0285* (2013.01); *G02B 6/0365* (2013.01); *G02B 6/03622* (2013.01); *G02B 6/03694* (2013.01)

(58) Field of Classification Search
CPC ... G02B 6/0283; G02B 6/0285; G02B 6/0365
USPC ......................................... 385/124, 126–128
See application file for complete search history.

(56) References Cited

U.S. PATENT DOCUMENTS 4,852,968 A     8/1989   Reed
8,588,569 B2 *  11/2013  Bookbinder et al. ......... 385/124
(Continued)

FOREIGN PATENT DOCUMENTS

CN   101196593 A    6/2008
CN   101598834 A   12/2009
(Continued)

OTHER PUBLICATIONS

State Intellectual Property Office of the P. R. China (ISA/CN), "International Search Report", Mar. 21, 2013, China.

*Primary Examiner* — Ryan Lepisto
(74) *Attorney, Agent, or Firm* — Tim Tingkang Xia, Esq.; Locke Lord LLP

(57) ABSTRACT

In one aspect of the invention, the bend insensitive single-mode optical fiber includes a core layer and cladding layers having an inner cladding layer, a trench cladding layer and an outer cladding layer sequentially formed surrounding the core layer from inside to outside. For the core layer, the diameter is 7-7.9 μm, and the relative refractive index difference $\Delta_1$ is between $4.6 \times 10^{-3}$ and $6.5 \times 10^{-3}$. For the inner cladding layer, the diameter is 16.5-20 μm, and a relative refractive index difference $\Delta_2$ is between $-3 \times 10^{-4}$ and $3 \times 10^{-4}$. For the trench cladding layer, the diameter is 33-40 μm, and the relative refractive index difference $\Delta_3$ is between $-2.9 \times 10^{-3}$ and $-7.3 \times 10^{-3}$, changes in a gradient manner and increases gradually from outside to inside, where a relative refractive index difference $\Delta_{32}$ at an outermost interface is smaller than a relative refractive index difference $\Delta_{31}$ at an innermost interface.

14 Claims, 1 Drawing Sheet

(56) References Cited

U.S. PATENT DOCUMENTS

| | | | |
|---|---|---|---|
| 8,666,214 B2* | 3/2014 | Bookbinder et al. | 385/124 |
| 8,953,917 B2* | 2/2015 | Berkey et al. | 385/127 |
| 2011/0058780 A1* | 3/2011 | Han et al. | 385/124 |

FOREIGN PATENT DOCUMENTS

| | | |
|---|---|---|
| CN | 102141649 A | 8/2011 |
| CN | 102540327 A | 7/2012 |
| CN | 102590933 A | 7/2012 |

* cited by examiner

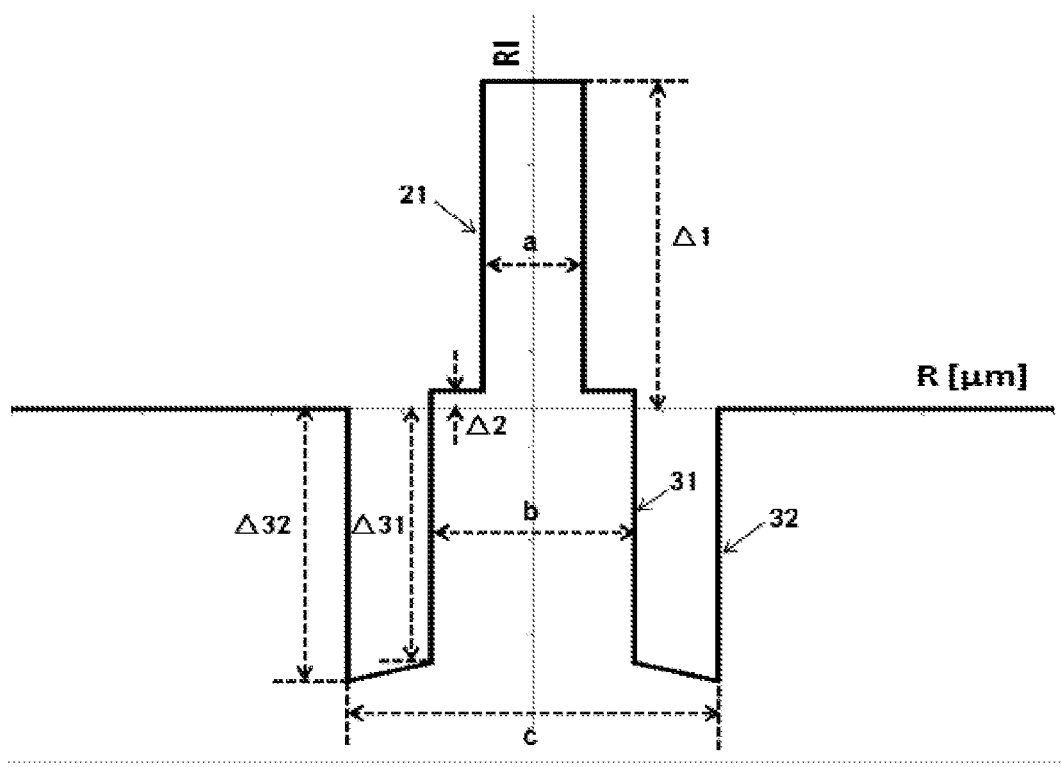

BENDING INSENSITIVE SINGLE MODE OPTICAL FIBER

CROSS-REFERENCE TO RELATED APPLICATIONS

This application is a continuation application of International Patent Application No. PCT/CN2012/086974, filed Dec. 20, 2012, which itself claims the priority to Chinese Patent Application No. 201210006792.4, filed Jan. 10, 2012 in the State Intellectual Property Office of P.R. China, which are hereby incorporated herein in their entireties by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates generally to the field of optical fiber communication and transmission, and more particularly to a bending insensitive single-mode optical fiber having high bending resistance performance and a desired effective area.

BACKGROUND OF THE INVENTION

In recent years, fiber to the home (FTTh) and fiber to the desktop (FTTd) gradually become one development direction in the construction of communications networks and the construction of future optical fiber networks. Nowadays, conventional low water peak optical fibers (meeting ITU-T G.652C/D) have found wide applications in optical fiber access network and generally have a bend radius of 30 mm. In the configuration process of FTTx optical fibers, cabling of optical fibers is often needed indoors and in narrow environments. Optical fibers are subject to high bending stresses at a small bend radius, and especially in practical applications, optical fibers are often wound in storage boxes that become increasingly small. Therefore, it becomes necessary to develop an optical fiber having high bending resistance performance to meet the requirements for FTTx network cabling and device miniaturization. In November 2009 and June 2010, ITU-T has amended the bend insensitive G.657 optical fiber standard twice and added a research report on lifetime performance of optical fibers having small bend radiuses ('Characteristics of a bending loss insensitive single-mode optical fiber and cable for the access network' and Amendment 1: Revised Appendix 1-Lifetime expectation in case of small radius bending of single-mode fiber). The two times of amendments have basically specified different application targets of the G.657A1/A2 optical fiber and the G.657.B3 optical fiber in different bend radius use environments. The G.657.A1 optical fiber that meets the minimum bend radius of 10 mm is applicable to long-haul networks. The G.657.A2 optical fiber meets applications on the condition of a minimum bend radius of 7.5 mm and is mainly applied in metro networks and FTTh. The G.657.B3 optical fiber meets the use condition of a minimum bend radius of 5 mm, is mainly applied in fiber to the desktop (FTTd) and all-optical networks and used in the manner of indoor optical fiber/optical cable, and focuses on the service life problem of optical fibers in a bending condition.

Based on the specifications of ITU-T and the specific use environments and conditions of the G.657.B3 optical fiber, the G.657.B3 optical fiber is basically used for short distance communication transmission and focuses more on macro-bending performance at a small bend radius, and the compatibility with the G.652.D standard is not mandatory. However, because the G.652.D has been widely used in the optical communication field for decades, the use habits of most of the customers, optical fiber cabling habits, and peer equipment are designed on the basis of the G.652 optical fiber design. Therefore, the development of a G.657.B3 optical fiber compatible with the G.652 optical fiber standard further facilitates promotion and use of optical communications.

After years of researches, scientists and researchers all over the world have found that the mode field diameter and cut-off wavelength of an optical fiber play a major role in macro-bending loss of the optical fiber. A MAC value can qualitatively measure the bending performance of an optical fiber, in which MAC is defined as a ratio between a mode field diameter and a cut-off wavelength. When the MAC is smaller, the bending performance of the optical fiber is higher. Apparently, the object of lowering the MAC can be achieved by lowering a mode field diameter and increasing a cut-off wavelength of an optical fiber, so as to obtain high bending performance. U.S. publications No. 2007/007016, and Chinese patent Nos. CN1971321A, and CN1942793A adopt this type of methods. However, when a mode field diameter of an optical fiber is too small, a large connection loss occurs in its connection with a conventional single-mode optical fiber, and the incident optical power is limited. Also, in consideration of a multi-service characteristic of FTTx, it is expected to use the full band for transmission, and the cut-off wavelength of the optical cable has to be smaller than 1260 nm. Therefore, the space for the cut-off wavelength of the optical fiber to increase is very limited. High bending performance cannot be effectively obtained only depending on the method of lowering a MAC value of an optical fiber to meet the G.657.B3 standard requirements.

In contrast to the ordinary sectional structure of the single-mode optical fiber, another effective method of enhancing the bending performance of an optical fiber is to adopt a design of a depressed inner cladding layer. For example, the design of a depressed inner cladding layer is adopted in U.S. Pat. Nos. 5,032,001, 7,043,125, and Chinese patent No. CN176680. Through the design of a depressed inner cladding layer, the numerical aperture (NA) of an optical fiber can be increased without increasing doping in the core layer, so as to avoid the increase of attenuation caused by increased doping. However, the optimized design of a depressed inner cladding layer can only improve the macro-bending performance of an optical fiber at a large bend radius to a certain extent. When the bend radius of an optical fiber is smaller than or equal to 10 mm, it is very difficult to adopt the method of a depressed inner cladding layer to prepare a bend insensitive optical fiber that meets the G.657.A2 standard.

It is found through further researches that the most effective method of enhancing bending resistance performance of an optical fiber is to design the cross-section of an optical fiber by adopting a structure of a trench cladding layer, the basic waveguide structure thereof is described in U.S. Pat. Nos. 4,852,968 and 6,535,679 and Chinese patent No. CN1982928A also adopt the same type of design. However, all the above patents only consider how to lower a bending induced loss and none considers a long service life of the optical fiber at a small bend radius in combination with specific applications, and also none explicitly illustrates whether an optical fiber fabricated according to the specification thereof meets or goes beyond the relevant requirement of a minimum bend radius of 5 mm in the G.657.B3 standard. It is found through the research on an optical fiber having the structure of a trench cladding layer that certain requirements and limitations also exist about the depth and width of a trench cladding layer in the cross-section of an optical fiber: if the trench cladding layer is too shallow or too narrow, the desirable bend insensitive performance is not achieved; and if too deep or too wide, the cut-off wavelength and dispersion performance of an optical fiber might be affected.

In a bend insensitive optical fiber having the structure of a trench cladding layer, another factor that affects the macrobending performance of an optical fiber in a bending condition is a core/cladding layer diameter ratio of the optical fiber. When the optical fiber is in a bending state, as the circular cladding of the inner cladding layer envelops the core layer, the stress generated from bending first acts on the inner cladding layer and is then transferred to the core layer part. Without considering factors such as the core layer, cladding layer doping, and refractive index, a small core layer/cladding layer diameter ratio helps to enhance the bending performance of an optical fiber. However, a small core layer/cladding layer diameter ratio usually also affects performance such as MFD and dispersion of an optical fiber, and the matching of viscosity and stress also becomes more difficult in the drawing process. Therefore, a suitable core layer/cladding layer diameter ratio is also an important direction in researches on the cross-section of the G.657.B3 optical fiber. The latest researches indicate that: in an optical fiber link, especially an FTTx link, due to the existence of multiple bends and connectors, the phenomenon of a multi-path interference (MPI) might occur in the optical fiber. David. Zhen et al. has introduced the method of testing an MPI in OFC/NFOEC ('Testing MPI Threshold in Bend Insensitive Fiber Using Coherent Peak-To-Peak Power Method') in 2009. Especially in the optical fiber design of a trench cladding layer, if the depressed cladding layer is too close to the core layer, once a core layer offset occurs at an connector of an optical fiber, multi-path interferences occur easily. If the depressed cladding layer is too far away from the core layer, the effect of lowering the bending induced loss of the optical fiber cannot be achieved. Therefore, it is necessary to perform precise positioning on the depressed cladding layer. Hence, to properly design the cross-section of an optical fiber and obtain a desirable balance in the refractive index sectional structure of a core layer, a cladding layer, and a trench cladding layer is a focus and a challenge in the research of the G.657.B3 optical fiber.

In addition, during the use of an access network, apart from adopting a splicing method for an optical fiber connection, a mechanical connection manner may further be adopted. For example, an optical fiber mechanical connecting terminal requires that an optical fiber has a good end face quality after being cut; therefore, the optical fiber needs to have desirable material homogeneity.

Therefore, a heretofore unaddressed need exists in the art to address the aforementioned deficiencies and inadequacies.

SUMMARY OF THE INVENTION

The present invention relates to a bend insensitive single-mode optical fiber for solving the deficiencies in the prior art. The bend insensitive single-mode optical fiber, by optimizing an optical fiber cross-section, not only has a lower bending induced loss, stable mechanical performance, and a homogeneous material formation, but also can appropriately reduce the diameters of optical fiber's inner and trench cladding layers on the basis of keeping the diameter of the effective mode field and the bending performance, thereby lowering the fabrication cost of an optical fiber preform and an optical fiber.

In one aspect of the present invention, the bend insensitive single-mode optical fiber includes a core layer, where a diameter, a, of the core layer is between 7 µm and 7.9 µm, and a relative refractive index difference $\Delta_1$ of the core layer is between $4.6 \times 10^{-3}$ and $6.5 \times 10^{-3}$.

The bend insensitive single-mode optical fiber also includes cladding layers surrounding the core layer. The cladding layers comprises an inner cladding layer surrounding the core layer, a trench cladding layer surrounding the inner cladding layer and an outer cladding layer surrounding the trench cladding layer.

A diameter, b, of the inner cladding layer is between 16.5 µm and 20 µm, and a relative refractive index difference $\Delta_2$ of the inner cladding layer is between $-3 \times 10^{-4}$ and $3 \times 10^{-4}$.

A diameter, c, of the trench cladding layer is between 33 µm and 40 µm, and a relative refractive index difference $\Delta_3$ of the trench cladding layer is between $-2.9 \times 10^{-3}$ and $-7.3 \times 10^{-3}$. The relative refractive index difference $\Delta_3$ changes in a gradient manner and increases gradually from outside to inside of the trench cladding layer, where a relative refractive index difference $\Delta_{32}$ at an outermost interface between the trench cladding layer and the outer cladding layer is smaller than a relative refractive index difference $\Delta_{31}$ at an innermost interface between the trench cladding layer and the inner cladding layer.

In one embodiment, the outer cladding layer has the diameter, d, being 125±0.7 µm, and the refractive index of the outer cladding layer is the refractive index of pure silicon dioxide glass.

In one embodiment, the core layer is a germanium (Ge) and fluorine (F) doped quartz glass layer comprising materials of $SiO_2$, $GeO_2$, F and Cl, where a fluorine (F) contribution $\Delta F$ is between $1 \times 10^{-3}$ and $1.6 \times 10^{-3}$.

In one embodiment, the inner cladding layer is a germanium and fluorine doped quartz glass layer comprising materials of $SiO_2$, $GeO_2$, F and Cl. The doped fluorine and the doped germanium in the inner cladding layer change in a gradient manner and increase gradually and continuously from an outermost interface 31 (the deposition start point of the inner cladding layer) between the inner cladding layer and the trench cladding layer and to an innermost interface 21 (the deposition end point of the inner cladding layer) between the inner cladding layer and the core layer. The fluorine contribution $\Delta F$ at the outermost interface 31 between the inner cladding layer and the trench cladding layer is between $1.2 \times 10^{-3}$ and $1.6 \times 10^{-3}$, and the fluorine contribution $\Delta F$ at the innermost interface 21 between the inner cladding layer and the core layer is between $2.1 \times 10^{-3}$ and $2.4 \times 10^{-3}$.

In one embodiment, the mode field diameter of the optical fiber at the wavelength of 1310 nm is between 7 µm and 9.2 µm.

In one embodiment, the attenuation coefficient of the optical fiber at the wavelength of 1310 nm is smaller than or equal to 0.4 dB/km, the attenuation coefficient at the wavelength of 1383 nm is smaller than or equal to 0.4 dB/km, the attenuation coefficient at the wavelength of 1550 nm is smaller than or equal to 0.25 dB/km, the attenuation coefficient at the wavelength of 1625 nm is smaller than 0.3 dB/km.

In one embodiment, the optical fiber has an optical cable cut-off wavelength smaller than or equal to 1260 nm.

In one embodiment, at a wavelength of 1625 nm, macro bending induced loss per turn at a bending radius of 10 mm is smaller than or equal to 0.1 dB; macro bending induced loss per turn at a bending radius of 7.5 mm is smaller than or equal to 0.25 dB; macro bending induced loss per turn at a bending radius of 5 mm is smaller than or equal to 0.45 dB. At the wavelength of 1550 nm, macro bending induced loss per turn at a bending radius of 10 mm is smaller than or equal to 0.03 dB; macro bending induced loss per turn at a bending radius of 7.5 mm is smaller than or equal to 0.08 dB; and macro bending induced loss per turn at a bending radius of 5 mm is smaller than or equal to 0.15 dB.

In another aspect of the present invention, a fabrication method of the bend insensitive single-mode optical fiber includes the steps of:

installing a pure quartz glass bushing on a modified plasma chemical vapor deposition (PCVD) lathe, and introducing reaction gases for processing;

introducing a fluorine-containing gas in the reaction gases silicon tetrachloride ($SiCl_4$) and oxygen ($O_2$), where the fluorine-containing gas is random one or more of $C_2F_6$, $CF_4$, $SiF_4$, and $SF_6$, so as to perform fluorine (F) doping, and introducing germanium tetrachloride ($GeCl_4$) to perform germanium (Ge) doping;

ionizing the reaction gases inside the bushing through a microwave into plasma and eventually depositing the reaction gases on the inner wall of the bushing in the form of glass;

according to the foregoing doping requirements, changing the flow of the doping gas in the mixed gas at a proper time, and sequentially depositing the trench cladding layer, the inner cladding layer, and the core layer;

after the deposition is accomplished, melting the deposition tube with an electric heating furnace into a solid core rod, fabricating a perform by adopting an RIT process with pure quartz glass as a sleeve tube, or preparing an outer cladding layer by adopting an OVD or VAD or APVD outer cladding deposition process to fabricate a preform; and placing the preform on an optical fiber drawing tower to draw the perform into an optical fiber, and applying inner and outer layers of ultraviolet-cured polyacrylic acid resin on the surface of the optical fiber.

According to the present invention, the bend insensitive single-mode optical fiber has a functional gradient material formation and structure, which includes a core layer and an inner cladding layer, a trench cladding layer, and an outer cladding layer of a functional gradient structure. The characteristics thereof are, among other thing, the trench cladding layer is fluorine (F) doped quartz glass, and has a minimum refractive index and a minimum modulus, so that while the bending resistance performance of the optical fiber is enhanced, a tensile stress generated at the surface of the optical fiber because the germanium (Ge) doped core layer has a high thermal expansion coefficient can be buffered, so as not to affect the mechanical performance of the optical fiber, and a compressive stress is formed at the core layer region of the optical fiber, so that an additional stress caused by bending in the bending process of the optical fiber does not easily transfer to the core layer region to cause an increase in attenuation. The inner cladding layer and the core layer are fluorine doped and germanium doped quartz glass, so as to ensure that the optical fiber has the optical performance meeting the G.657.B3 standard. The viscosities of the core layer and the inner cladding layer at the interfaces thereof are similar, so as to prevent defects from occurring on the interface of the core layer/cladding layer in the drawing process. Also, in the inner cladding layer, from the outside 31 to the inside 21, the doped fluorine (F) and the doped germanium (Ge) increase gradually and continuously, and change in a gradient manner, so that the expansion coefficient increases gradually to prevent a residual stress from occurring in the drawing process. The specific implementation is through a difference in the viscosity and thermal expansion coefficient for fluorine (F) doped and germanium (Ge) doped quartz glass. As the doping of Cl affects little on Rayleigh scattering of quartz glass but the doping of Cl can increase the refractive index of quartz glass and lower the viscosity thereof, when the core layer and inner cladding layer of the optical fiber have high Cl content, the doped amount of Ge can be reduced to lower the attenuation coefficient of the optical fiber. However, the Cl content cannot too high lest bubbles form easily. In the trench cladding layer, low Cl content can reduce the doped amount of F to prevent the viscosity of the part from becoming too low. For the PCVD process, the Cl content is mainly determined by the furnace temperature and the O/Si ratio of the reaction gases: the Cl content lowers as the furnace temperature rises, and lowers as O/Si increases. During the deposition of the trench cladding layer, the furnace temperature is controlled between 1080° C. and 1150° C., and the O/Si ratio is between 3.0 and 3.5, so that the Cl content is smaller than 2000 ppm. During the deposition of the inner cladding layer and the core layer, the furnace temperature is controlled between 1000° C. and 1050° C., and the O/Si ratio is between 2.2 and 2.6, so that the Cl content is between 3500 ppm and 4200 ppm.

The beneficial effects of the present invention lie in that: (1). By optimizing an optical fiber cross-section, especially by properly increasing the depth and width of the trench cladding layer of the optical fiber, the optical fiber not only has a low bending induced loss, but also has stable mechanical performance and a homogeneous material formation. (2). By optimizing the structure of an optical fiber cross-section, on the basis of keeping an effective mode field diameter and bending performance, the ratios of the core layer and the trench cladding layer in the optical fiber cross-section are reduced, so that the deposition processing amount in the most crucial, precise, and complex part in the fabrication of an optical fiber perform is also directly reduced, thereby lowering the control difficulty of the processes, increasing the processing efficiency of the optical fiber preform, and lowering the fabrication cost of the optical fiber. (3). The optical fiber of the present invention meets or goes beyond the ITU TG.657.B3 standard in various kinds of performance, especially has desirable macro-bending performance, and meets the requirements for FTTh cabling and device miniaturization.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1 is a schematic view of a refractive index section of an optical fiber of the present invention.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "core rod" refers to a perform containing a core layer and a part of cladding layers.

As used herein, the term "refractive index section" refers to the relationship between a refractive index of glass and a radius of an optical fiber or an optical fiber preform (including the core rod).

As used herein, the term "relative refractive index difference" is defined by $$\Delta = [(n_i^2 - n_0^2)/2n_i^2] \times 100\% \approx \frac{n_i - n_0}{n_0} \times 100\%,$$

where $n_i$ and $n_0$ are respectively a refractive index of each corresponding portion and a refractive index of pure silica quartz glass. Unless otherwise defined, $n_i$ refers to the maximal refractive index of each corresponding portion in the specification.

As used herein, the term "Fluorine (F) contribution" refers to the absolute value of a refractive index difference value of fluorine (F) doped quartz glass relative to pure quartz glass, that is, $\Delta_F = |n_F - n_0|$, which is used to represent a fluorine (F)-doping amount.

As used herein, the term "Germanium (Ge) contribution" refers to the absolute value of a refractive index difference value of germanium (Ge) doped quartz glass relative to pure quartz glass, that is, $\Delta_{Ge} = |n_{Ge} - n_0|$, which is used to represent a germanium (Ge)-doping amount.

As used herein, the term "sleeve tube" refers to a thick-wall high-purity quartz glass tube that meets a certain sectional area requirement.

As used herein, the term "RIT process" refers to inserting a core rod in a sleeve tube to form an optical fiber preform.

As used herein, the term "OVD outer cladding deposition process" refers to preparing $SiO_2$ glass of a desired thickness at the surface of a core rod by adopting outside vapor deposition and sintering processes.

As used herein, the term "VAD outer cladding deposition process" refers to preparing $SiO_2$ glass of a desired thickness at the surface of a core rod by adopting vapor axial deposition and sintering processes;

As used herein, the term "APVD outer cladding process" refers to melting natural or synthetic quartz powders using a high-frequency plasma flame to prepare $SiO_2$ glass of a desired thickness at the surface of a core rod.

As used herein, the term "O/Si ratio" refers to a mole ratio of oxygen ($O_2$) to silicon tetrachloride ($SiCl_4$) introduced into the reaction region.

The description will be made as to the embodiments of the present invention in conjunction with the accompanying drawings. In accordance with the purposes of this invention, as embodied and broadly described herein, this invention, in one aspect, relates to a bend insensitive single-mode optical fiber.

Embodiment 1

Referring to FIG. 1, the bend insensitive single-mode optical fiber in this embodiment includes a core layer and cladding layers surrounding the core layer. The cladding layers have an inner cladding layer, a trench cladding layer, and an outer cladding layer sequentially formed to cover the core layer from inside to outside. The relative refractive index difference $\Delta_3$ of the trench cladding layer changes in a gradient manner, and increases gradually from outside to inside. The relative refractive index difference $\Delta_{32}$ at the outermost interface 32 is smaller than the relative refractive index difference $\Delta_{31}$ at the innermost interface 31. The outer cladding layer surrounds the trench cladding layer. The diameter d of the outer cladding layer is about 125 μm. The refractive index of the outer cladding layer is the refractive index of pure silicon dioxide glass.

The core layer and the inner cladding layer are a germanium and fluorine doped quartz glass layer, comprising the materials of $SiO_2$, $GeO_2$, F and Cl. From the outermost interface 31 to the innermost interface 21 of the inner cladding layer, the doped fluorine and doped germanium increase gradually and continuously, and change in a gradient manner. At the outermost interface 31 (the deposition start point of the inner cladding layer), fluorine (F) contribution ΔF is between $1.2 \times 10^{-3}$ and $1.6 \times 10^{-3}$. At the innermost interface 21 (the deposition end point of the inner cladding layer), fluorine (F) contribution ΔF is between $2.1 \times 10^{-3}$ and $2.4 \times 10^{-3}$.

For the fluorine (F) doped and germanium (Ge) doped quartz glass layer, fluorine and germanium both lower the viscosity of quartz glass. However, the influence degrees are different, that is, when causing the same refractive index difference, the influence of fluorine on the viscosity is three times large as that of germanium. Through systematic researches, to match the core/cladding viscosity, $\Delta_{F2} = \Delta_{F1} - 0.205 * \Delta_{Total}$ needs to be met. $\Delta_{F1}$ and $\Delta_{F2}$ are fluorine (F) contribution in the core layer and the inner cladding layer, respectively, and $\Delta_{Total}$ is the relative refractive index difference of the core layer relative to the inner cladding layer.

For the thermal expansion coefficient of the fluorine (F) doped and germanium (Ge) doped quartz glass, the doping of fluorine (F) lowers the thermal expansion coefficient of quartz glass, and the doping of germanium (Ge) increases the thermal expansion coefficient of quartz glass. The thermal expansion coefficient $\alpha_{SiO_2-GeO_2-F}$(/° C.) can be calculated using the following formula: $\alpha_{SiO_2-GeO_2-F} = (5 + 8.3\Delta_{Ge} + 2.3\Delta_F) \times 10^{-7}$.

By adopting the structural design of the trench cladding layer, the fluorine (F) doping amount is designed according to the above result. After fluorine (F) is determined, the refractive index section can be determined and the germanium (Ge) doping amounts in all parts can be designed. According to the method in the present invention, a perform with an outer diameter between 150 mm to 205 mm is prepared. At a drawing speed between 1500 meter/minute to 2000 meter/minute, apply a double-layer ultraviolet-cured acrylic ester coating and prepare an optical fiber with an outer diameter of 250 μm. The structure of the optical fiber is shown in Table 1, where the refractive index parameter is an arithmetic mean of the practical optical fiber parameters.

In this embodiment, by properly optimizing the structure of an optical fiber cross-section, the optical fiber performance parameters, on the basis of meeting the G.657.B3 standard, are compatible with the G.657.A2 standard, so as to achieve better upward compatibility.

The macro-bending induced loss (i.e., added loss by bending) test method is referred to the method specified in IEC 60793-1-47. As bending sensitivity becomes higher as the wavelength increases, the bending induced loss of the optical fiber at 1625 nm is mainly tested, so as to accurately estimate the bend sensitivity of the optical fiber inside the full band range (especially the L band). Wind the optical fiber into 1 loop (round) or 10 loops at a certain diameter, unfold the loop, and test a change in optical power before and after the loop winding, which is used as the macro-bending induced loss of the optical fiber. To accurately evaluate the mechanical performance of the optical fiber, a reliable method requires to be used to test the strength distribution of the optical fiber. The filtering test filters optical fibers with large fractures. Further analysis and tests require to be performed on optical fibers that pass the filtering test to discover and evaluate the reliability of the optical fibers. The main performance parameters of an optical fiber are shown in Table 2.

TABLE 1

Structure of the optical fiber and material formation

| | Core Layer | | Inner Cladding Layer | | Trench cladding layer | |
| --- | --- | --- | --- | --- | --- | --- |
| Sequence Number | Diameter (μm) | Refractive Index Difference $\Delta_1$ ($\times 10^{-3}$) | Diameter (μm) | Refractive Index Difference $\Delta_2$ ($\times 10^{-4}$) | Diameter (μm) | Absolute Value of Refractive Index Difference $\Delta_3$ ($\times 10^{-3}$) |
| 1 | 7.58 | 5.51 | 17.2 | 0.8 | 35.1 | 3.9 |
| 2 | 7.60 | 5.76 | 17.2 | 1.1 | 35.7 | 4.0 |
| 3 | 7.73 | 5.53 | 16.8 | 0.6 | 34.9 | 3.8 |
| 4 | 7.60 | 5.75 | 17.1 | 0.3 | 35.5 | 3.9 |
| 5 | 7.64 | 5.38 | 16.9 | 0.8 | 34.5 | 3.8 |
| 6 | 7.66 | 5.53 | 17.4 | 0.5 | 35.1 | 4.0 |
| 7 | 7.71 | 5.82 | 17.3 | 0.9 | 34.2 | 3.7 |
| 8 | 7.57 | 5.57 | 17.2 | 0.6 | 36.2 | 4.2 |
| 9 | 7.62 | 5.57 | 17.1 | 0.4 | 35.3 | 4.0 |
| 10 | 7.75 | 5.84 | 17.4 | −0.1 | 35.4 | 3.8 |

TABLE 2

Main performance parameters of the optical fiber

| Sequence Number | MFD @1310 (nm) | Optical Cable Cut-off Wavelength (nm) | 1625-nm Wavelength Bending induced loss [dB/loop] Φ10 mm | Zero-dispersion Wavelength (nm) Φ15 mm | Zero-dispersion Wavelength (nm) Φ20 mm | Zero-dispersion Slope [ps/nm$^2$ * km] | Dynamic Fatigue Parameter | Zero-dispersion Wavelength (nm) |
|---|---|---|---|---|---|---|---|---|
| 1 | 8.59 | 1232 | 0.232 | 0.129 | 0.057 | 1315 | 0.090 | 29.3 |
| 2 | 8.47 | 1243 | 0.175 | 0.095 | 0.040 | 1318 | 0.090 | 32.4 |
| 3 | 8.70 | 1222 | 0.367 | 0.194 | 0.083 | 1307 | 0.090 | 31.4 |
| 4 | 8.66 | 1254 | 0.274 | 0.158 | 0.067 | 1308 | 0.087 | 29.6 |
| 5 | 8.73 | 1236 | 0.323 | 0.175 | 0.078 | 1309 | 0.089 | 31.8 |
| 6 | 8.61 | 1228 | 0.287 | 0.148 | 0.070 | 1317 | 0.090 | 29.5 |
| 7 | 8.71 | 1250 | 0.343 | 0.187 | 0.088 | 1315 | 0.089 | 30.6 |
| 8 | 8.43 | 1237 | 0.151 | 0.083 | 0.038 | 1319 | 0.090 | 29.4 |
| 9 | 8.53 | 1237 | 0.264 | 0.142 | 0.062 | 1319 | 0.089 | 29.7 |
| 10 | 8.66 | 1243 | 0.237 | 0.137 | 0.053 | 1310 | 0.086 | 29.1 |

Embodiment 2

In this embodiment, in the design of the optical fiber section, the MFD of the optical fiber is appropriately reduced to lower the MAC, so as to further optimize the macro-bending performance of the optical fiber. As the MAC lowers, some changes occur to the dispersion and mode field diameter. The optical fiber in this embodiment can meet the G.657.B3 standard but is not compatible with the G.652.D standard.

In this embodiment, the PCVD+OVD processes are still adopted to prepare the G.657 optical fiber perform, where the drawing speed is 1500 m/min, and the fiber diameter of the naked optical fiber is 125±0.7 μm. A double-layer ultraviolet-cured optical fiber coating is adopted, and after applying, the outer diameter of the optical fiber is 245±7 μm.

The structure of the optical fiber and the material formation are shown in Table 3, where the refractive index parameter in Table 3 is an arithmetic mean of practical optical fiber parameters. Table 4 is performance data of the optical fiber. According to the results of these tests, after the optical fiber cross-section is appropriately optimized and the diameters of the core layer and inner cladding layer are reduced, the mode field diameter of the optical fiber can be kept at a proper range. The bending performance on the condition of a bend radius of 5 mm meets or goes beyond the G.657.B3 standard. Based on the overall concept of such a technical solution, because in the G.657.B3 standard, the range of the mode field diameter is wide, and dispersion is not strictly required, the diameter of the core layer can be further reduced and the refractive index of the core layer can be further increased regardless of dispersion, so as to obtain better macro-bending performance.

TABLE 3

Structure of the optical fiber and material formation

| | Core Layer | | Inner Cladding Layer | | Trench cladding layer | |
|---|---|---|---|---|---|---|
| Sequence Number | Diameter (μm) | Refractive Index Difference $\Delta_1$ ($\times 10^{-3}$) | Diameter (μm) | Refractive Index Difference $\Delta_2$ ($\times 10^{-4}$) | Diameter (μm) | Absolute Value of Refractive Index Difference $\Delta_3$ ($\times 10^{-3}$) |
| 1 | 7.60 | 5.47 | 17.1 | 0.4 | 35.4 | 2.7 |
| 2 | 7.52 | 5.63 | 17.3 | 1.0 | 36.1 | 3.9 |
| 3 | 7.74 | 5.64 | 17.2 | 0.7 | 36.3 | 3.8 |
| 4 | 7.70 | 5.57 | 16.9 | 0.6 | 35.2 | 3.9 |
| 5 | 7.68 | 5.68 | 16.0 | 0.4 | 34.2 | 4.0 |
| 6 | 7.64 | 5.67 | 17.3 | 0.3 | 36.6 | 4.6 |
| 7 | 7.63 | 5.53 | 17.5 | 0 | 35.9 | 4.2 |
| 8 | 7.77 | 5.42 | 17.6 | 1.0 | 34.0 | 3.8 |
| 9 | 7.71 | 5.47 | 17.4 | 0.2 | 34.9 | 4.1 |
| 10 | 7.60 | 5.80 | 16.9 | 0.1 | 35.6 | 4.4 |

TABLE 4

Main performance parameters of the optical fiber

| Sequence Number | MFD @1310 (nm) | Optical Cable Cut-off Wavelength (nm) | 1625-nm Bending Induced Loss [dB/loop] | | | Dynamic Fatigue Parameter |
|---|---|---|---|---|---|---|
| | | | Φ10 mm | Φ15 mm | Φ20 mm | |
| 1 | 8.12 | 1233 | 0.245 | 0.141 | 0.049 | 33.7 |
| 2 | 8.01 | 1247 | 0.213 | 0.116 | 0.048 | 32.4 |
| 3 | 7.82 | 1238 | 0.216 | 0.117 | 0.052 | 31.6 |
| 4 | 7.61 | 1244 | 0.193 | 0.092 | 0.046 | 31.2 |
| 5 | 7.49 | 1239 | 0.166 | 0.101 | 0.055 | 31.7 |
| 6 | 7.32 | 1241 | 0.130 | 0.071 | 0.037 | 32.6 |
| 7 | 7.44 | 1253 | 0.129 | 0.064 | 0.040 | 30.5 |
| 8 | 7.92 | 1249 | 0.227 | 0.116 | 0.047 | 32.3 |
| 9 | 7.51 | 1245 | 0.205 | 0.098 | 0.054 | 31.7 |
| 10 | 7.20 | 1231 | 0.125 | 0.058 | 0.039 | 30.5 |

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A bend insensitive single-mode optical fiber, comprising:
    a core layer; and
    cladding layers surrounding the core layer,
    wherein a diameter, a, of the core layer is between 7 μm and 7.9 μm, and a relative refractive index difference $\Delta_1$ of the core layer is between $4.6 \times 10^{-3}$ and $6.5 \times 10^{-3}$; and
    wherein the cladding layers surrounding the core layer comprises an inner cladding layer surrounding the core layer, a trench cladding layer surrounding the inner cladding layer and an outer cladding layer surrounding the trench cladding layer;
    wherein a diameter, b, of the inner cladding layer is between 16.5 μm and 20 μm, and a relative refractive index difference $\Delta_2$ of the inner cladding layer is between $-3 \times 10^{-4}$ and $3 \times 10^{-4}$; and
    wherein a diameter, c, of the trench cladding layer is between 33 μm and 40 μm, and a relative refractive index difference $\Delta_3$ of the trench cladding layer is between $-3.8 \times 10^{-3}$ and $-7.3 \times 10^{-3}$, wherein the relative refractive index difference $\Delta_3$ changes in a gradient manner and increases gradually from outside to inside of the trench cladding layer, and wherein a relative refractive index difference $\Delta_{32}$ at an outermost interface between the trench cladding layer and the outer cladding layer is smaller than a relative refractive index difference $\Delta_{31}$ at an innermost interface between the trench cladding layer and the inner cladding layer.

2. The bend insensitive single-mode optical fiber according to claim 1, wherein the core layer is a germanium and fluorine doped quartz glass layer comprising materials of $SiO_2$, $GeO_2$, F and Cl wherein a fluorine contribution $\Delta F$ is between $1 \times 10^{-3}$ and $1.6 \times 10^{-3}$.

3. The bend insensitive single-mode optical fiber according to claim 1, wherein the inner cladding layer is a germanium and fluorine doped quartz glass layer comprising materials of $SiO_2$, $GeO_2$, F and Cl, wherein the doped fluorine and the doped germanium in the inner cladding layer change in a gradient manner and increase gradually and continuously from an outermost interface between the inner cladding layer and the trench cladding layer and to an innermost interface between the inner cladding layer and the core layer, wherein the fluorine contribution $\Delta F$ at the outermost interface between the inner cladding layer and the trench cladding layer is between $1.2 \times 10^{-3}$ and $1.6 \times 10^{-3}$, and the fluorine contribution $\Delta F$ at the innermost interface between the inner cladding layer and the core layer is between $2.1 \times 10^{-3}$ and $2.4 \times 10^{-3}$.

4. The bend insensitive single-mode optical fiber according to claim 1, having a mode field diameter at the wavelength of 1310 nm being in a range between 7 μm and 9.2 μm.

5. The bend insensitive single-mode optical fiber according to claim 1, having an attenuation coefficient at the wavelength of 1310 nm being smaller than or equal to 0.4 dB/km, the attenuation coefficient at the wavelength of 1383 nm being smaller than or equal to 0.4 dB/km, the attenuation coefficient at the wavelength of 1550 nm being smaller than or equal to 0.25 dB/km, and the attenuation coefficient at the wavelength of 1625 nm being smaller than 0.3 dB/km.

6. The bend insensitive single-mode optical fiber according to claim 1, having an optical cable cut-off wavelength being smaller than or equal to 1260 nm.

7. The bend insensitive single-mode optical fiber according to claim 1, wherein at a wavelength of 1625 nm, macro bending induced loss per turn at a bending radius of 10 mm is smaller than or equal to 0.1 dB; macro bending induced loss per turn at a bending radius of 7.5 mm is smaller than or equal to 0.25 dB; an macro bending induced loss per turn at a bending radius of 5 mm is smaller than or equal to 0.45 dB; and
    wherein at the wavelength of 1550 nm, macro bending induced loss per turn at a bending radius of 10 mm is smaller than or equal to 0.03 dB; macro bending induced loss per turn at a bending radius of 7.5 mm is smaller than or equal to 0.08 dB; and macro bending induced loss per turn at a bending radius of 5 mm is smaller than or equal to 0.15 dB.

8. The bend insensitive single-mode optical fiber according to claim 1, wherein the outer cladding layer has a diameter, d, being 125±0.7 μm, and a refractive index of the outer cladding layer is the refractive index of pure silicon dioxide glass.

9. The bend insensitive single-mode optical fiber according to claim 8, wherein the core layer is a germanium and fluorine doped quartz glass layer comprising materials of $SiO_2$, $GeO_2$, F and Cl, wherein a fluorine contribution $\Delta F$ is between $1\times10^{-3}$ and $1.6\times10^3$.

10. The bend insensitive single-mode optical fiber according to claim 8, wherein the inner cladding layer is a germanium and fluorine doped quartz glass layer comprising materials of $SiO_2$, $GeO_2$, F and Cl, wherein the doped fluorine and the doped germanium in the inner cladding layer change in a gradient manner and increase gradually and continuously from an outermost interface between the inner cladding layer and the trench cladding layer and to an innermost interface between the inner cladding layer and the core layer, wherein the fluorine contribution $\Delta F$ at the outermost interface between the inner cladding layer and the trench cladding layer is between $1.2\times10^{-3}$ and $1.6\times10^{-3}$, and the fluorine contribution $\Delta F$ at the innermost interface between the inner cladding layer and the core layer is between $2.1\times10^{-3}$ and $2.4\times10^{-3}$.

11. The bend insensitive single-mode optical fiber according to claim 8, having a mode field diameter at the wavelength of 1310 nm being in a range between 7 μm and 9.2 μm.

12. The bend insensitive single-mode optical fiber according to claim 8, having an attenuation coefficient at the wavelength of 1310 nm being smaller than or equal to 0.4 dB/km, the attenuation coefficient at the wavelength of 1383 nm being smaller than or equal to 0.4 dB/km, the attenuation coefficient at the wavelength of 1550 nm being smaller than or equal to 0.25 dB/km, and the attenuation coefficient at the wavelength of 1625 nm being smaller than 0.3 dB/km.

13. The bend insensitive single-mode optical fiber according to claim 8, having an optical cable cut-off wavelength being smaller than or equal to 1260 nm.

14. The bend insensitive single-mode optical fiber according to claim 8, wherein at a wavelength of 1625 nm, macro bending induced loss per turn at a bending radius of 10 mm is smaller than or equal to 0.1 dB; macro bending induced loss per turn at a bending radius of 7.5 mm is smaller than or equal to 0.25 dB; macro bending induced loss per turn at a bending radius of 5 mm is smaller than or equal to 0.45 dB; and wherein at the wavelength of 1550 nm, a macro bending induced loss per turn at a bending radius of 10 mm is smaller than or equal to 0.03 dB; macro bending induced loss per turn at a bending radius of 7.5 mm is smaller than or equal to 0.08 dB; and macro bending induced loss per turn at a bending radius of 5 mm is smaller than or equal to 0.15 dB.

\* \* \* \* \*